(12) United States Patent
Chen et al.

(10) Patent No.: US 11,546,108 B2
(45) Date of Patent: Jan. 3, 2023

(54) DOWNLINK SIGNAL MONITORING AND TRANSMITTING METHOD, AND PARAMETER CONFIGURATION METHOD AND APPARATUS

(71) Applicant: FUJITSU LIMITED, Kawasaki (JP)

(72) Inventors: Zhe Chen, Beijing (CN); Lei Song, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 17/145,995

(22) Filed: Jan. 11, 2021

(65) Prior Publication Data
US 2021/0135818 A1 May 6, 2021

Related U.S. Application Data

(63) Continuation of application No. PCT/CN2018/101314, filed on Aug. 20, 2018.

(51) Int. Cl.
*H04L 5/00* (2006.01)
*H04W 72/04* (2009.01)

(52) U.S. Cl.
CPC ......... *H04L 5/0048* (2013.01); *H04W 72/042* (2013.01)

(58) Field of Classification Search
CPC ........................... H04L 5/0048; H04W 72/042
See application file for complete search history.

(56) References Cited

U.S. PATENT DOCUMENTS

| 2015/0180625 | A1 | 6/2015 | Park et al. |
| 2015/0282126 | A1 | 10/2015 | Park et al. |
| 2015/0349855 | A1 | 12/2015 | Sesia et al. |

(Continued)

FOREIGN PATENT DOCUMENTS

| CN | 103906244 A | 7/2014 |
| CN | 104081683 A | 10/2014 |
| CN | 106374984 A | 2/2017 |

(Continued)

OTHER PUBLICATIONS

International Search Report of the International Searching Authority issued by State Intellectual Property Office of the P.R. China for the PCT application No. PCT/CN2018/101314, dated Apr. 8, 2019, with an English translation.

(Continued)

*Primary Examiner* — Ronald B Abelson
(74) *Attorney, Agent, or Firm* — Myers Wolin, LLC

(57) ABSTRACT

Downlink signal monitoring and transmitting method, and parameter configuration method and apparatus. The method includes: monitoring a downlink signal by a terminal equipment according to an antenna port quasi-co-location parameter; wherein the antenna port quasi-co-location parameter is related to a first cell and/or a second cell, or is related to a first reference signal index and a second reference signal index. Hence, even though a network device configures multiple carriers for the terminal equipment, the terminal equipment may be able to accurately determine an antenna port quasi-co-location parameter for receiving a downlink signal.

14 Claims, 7 Drawing Sheets

(56) References Cited

U.S. PATENT DOCUMENTS

| | | | |
|---|---|---|---|
| 2019/0069285 A1* | 2/2019 | Chandrasekhar | H04B 7/088 |
| 2021/0258062 A1* | 8/2019 | Koskela | H04W 74/0833 |

FOREIGN PATENT DOCUMENTS

| | | |
|---|---|---|
| CN | 106851816 A | 6/2017 |
| EP | 2 897 314 A1 | 7/2015 |
| JP | 2015-533062 A | 11/2015 |
| KR | 10-2015-0030661 A | 3/2015 |
| WO | 2011/063179 A1 | 5/2011 |
| WO | 2014/119888 A1 | 8/2014 |
| WO | 2018/128351 A1 | 7/2018 |

OTHER PUBLICATIONS

Examination Report issued by the Patent Office of India for corresponding Indian Patent Application No. 202137000205, dated Jan. 20, 2022, with an English translation.

3GPP TR 38.802 V14.2.0, "3rd Generation Partnership Project; Technical Specification Group Radio Access Network; Study on New Radio Access Technology Physical Layer Aspects (Release 14)", Sep. 2017.

Extended European search report with the supplementary European search report and the European search opinion issued by the European Patent Office for corresponding European Patent Application No. 18930724.2-1206, dated Jun. 13, 2022.

Communication pursuant to Rule 164(1) EPC with the partial supplementary European Search Report issued by the European Patent Office for corresponding European Patent Application No. 18930724.2-1205, dated Mar. 14, 2022.

CMCC, "Discussion on remaining issues on PT-RS", Agenda item: 7.1.2.3.4, 3GPP TSG RAN WG1 Meeting #92bis, R1-1804096, Sanya, China, Apr. 16-20, 2018.

Notice of Reasons for Refusal by the Japan Patent Office issued for corresponding Japanese Patent Application No. 2021-502926 dated Mar. 29, 2022, with an English translation.

Notice of Preliminary Rejection issued by the Korean Intellectual Property Office for corresponding Korean patent application No. 10-2021-7001720, dated Mar. 7, 2022, with English translation.

Mediatek Inc., "Summary 2 on Remaing issues on Beam Failure Recovery," Agenda Item 7.1.2.2.4, 3GPP TSG RAN WG1 Meeting #92, R1-1803441, Athens, Greece, Feb. 26-Mar. 2, 2018.

Notice of Final Rejection issued by the Korean Intellectual Property Office for corresponding Korean Patent Application No. 10-2021-7001720, dated Sep. 19, 2022, with an English translation.

* cited by examiner

DOWNLINK SIGNAL MONITORING AND TRANSMITTING METHOD, AND PARAMETER CONFIGURATION METHOD AND APPARATUS

CROSS-REFERENCE TO RELATED APPLICATION

This application is a continuation application of International Application PCT/CN2018/101314 filed on Aug. 20, 2018 and designated the U.S., the entire contents of which are incorporated herein by reference.

TECHNICAL FIELD

This disclosure relates to the field of communication technologies, and in particular to a downlink signal monitoring and transmitting method, and a parameter configuration method and apparatus.

BACKGROUND

In a high-frequency communication scenario, a communication link is susceptible to physical conditions, such as weather, obstacles, changes in directions and angles, and other factors, resulting in transmission failure in the original beam direction. A beam failure recovery technology is mainly directed to such a scenario, and quickly locate a new reliable beam direction by using measurement results of beam power in different directions, thereby completing rapid recovery of the link.

The beam failure recovery (BFR) technology is not only very effective in a single-carrier scenario, but also may play an important role in a multi-carrier scenario. In a multi-carrier scenario, a terminal equipment may be connected to one network device (such as a base station) or multiple network devices. When different carriers of a terminal equipment are connected to network devices in different directions at the same time, as spatial directions are relatively independent, at a certain moment, beam failures may occur in only a part of the connection on the different carriers. At this moment, the beam failure recovery technology needs to be optimized for such a scenario, such as use of carriers where no beam failure occurs for parameter measurement and data transmission, so as to improve robustness of the system.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that when the network device configures multiple carriers for the terminal equipment, the terminal equipment sometimes is unable to determine an antenna port quasi-co-location (QCL) parameter (which may also be referred to as a beam indicator) for receiving a downlink signal (such as a beam failure recovery response (BFR response).

Addressed to at least one of the above problems, embodiments of this disclosure provide a downlink signal monitoring and transmitting method, and a parameter configuration method and apparatus.

According to a first aspect of the embodiments of this disclosure, there is provided a downlink signal monitoring method, including:

monitoring a downlink signal by a terminal equipment according to an antenna port quasi-co-location parameter;

wherein the antenna port quasi-co-location parameter is related to a first cell and/or a second cell.

According to a second aspect of the embodiments of this disclosure, there is provided a downlink signal monitoring apparatus, including:

a monitoring unit configured to monitor a downlink signal according to an antenna port quasi-co-location parameter;

wherein the antenna port quasi-co-location parameter is related to a first cell and/or a second cell.

According to a third aspect of the embodiments of this disclosure, there is provided a downlink signal transmitting method, including:

transmitting a downlink signal by a network device to a terminal equipment according to an antenna port quasi-co-location parameter;

wherein the antenna port quasi-co-location parameter is related to a first cell and/or a second cell.

According to a fourth aspect of the embodiments of this disclosure, there is provided a downlink signal transmitting apparatus, including:

a signal transmitting unit configured to transmit a downlink signal to a terminal equipment according to an antenna port quasi-co-location parameter;

wherein the antenna port quasi-co-location parameter is related to a first cell and/or a second cell.

According to a fifth aspect of the embodiments of this disclosure, there is provided a downlink signal monitoring method, including:

monitoring a downlink signal by a terminal equipment according to an antenna port quasi-co-location parameter;

wherein the antenna port quasi-co-location parameter is related to a first reference signal index and a second reference signal index.

According to a sixth aspect of the embodiments of this disclosure, there is provided a downlink signal monitoring apparatus, including:

a monitoring unit configured to monitor a downlink signal according to an antenna port quasi-co-location parameter;

wherein the antenna port quasi-co-location parameter is related to a first reference signal index and a second reference signal index.

According to a seventh aspect of the embodiments of this disclosure, there is provided a downlink signal transmitting method, including:

transmitting a downlink signal by a network device to a terminal equipment according to an antenna port quasi-co-location parameter;

wherein the antenna port quasi-co-location parameter is related to a first reference signal index and a second reference signal index.

According to an eighth aspect of the embodiments of this disclosure, there is provided a downlink signal transmitting apparatus, including:

a signal transmitting unit configured to transmit a downlink signal to a terminal equipment according to an antenna port quasi-co-location parameter;

wherein the antenna port quasi-co-location parameter is related to a first reference signal index and a second reference signal index.

According to a ninth aspect of the embodiments of this disclosure, there is provided a communication system, including:

a terminal equipment including the downlink signal monitoring apparatus as described in the second or sixth aspect; and a network device including the downlink signal transmitting apparatus as described in the fourth or eighth aspect.

An advantage of the embodiments of this disclosure exists in that the terminal equipment monitors a downlink signal according to an antenna port quasi-co-location parameter; wherein the antenna port quasi-co-location parameter is related to a first cell and/or a second cell, or is related to a first reference signal index and a second reference signal index. Hence, even though a network device configures multiple carriers for the terminal equipment, the terminal equipment may be able to accurately determine an antenna port quasi-co-location parameter for receiving a downlink signal, thereby avoiding unnecessary link failures due to disalignment of reception and transmission beams, and correctly receiving downlink signals.

Another advantage of the embodiments of this disclosure exists in that the network device transmitting a downlink signal according to an antenna port quasi-co-location parameter; wherein the antenna port quasi-co-location parameter is related to a first cell and/or a second cell, or is related to a first reference signal index and a second reference signal index. Hence, even though the network device configures multiple carriers for a terminal equipment, the network device may be able to accurately determine an antenna port quasi-co-location parameter for transmitting a downlink signal, thereby avoiding unnecessary link failures due to disalignment of reception and transmission beams, and correctly transmitting downlink signals.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

Figure 1:
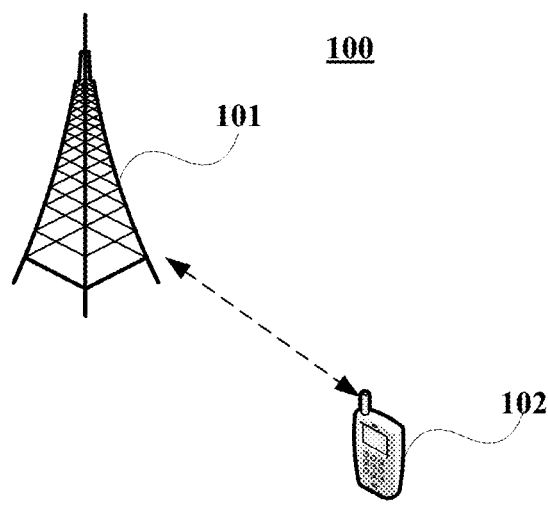
FIG. 1 is a schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a dedicated geographical area. And a term "cell" may refer to a base station and/or its coverage area, which is dependent on a context of the term.

In the embodiments of this disclosure, the term "user equipment (UE)" or "terminal equipment (TE) or terminal device" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and terminal equipments 102. For the sake of simplicity, an example having only one terminal equipment and one network device is schematically given in FIG. 1; however, the embodiment of this disclosure is not limited thereto.

In the embodiment of this disclosure, existing traffics or traffics that may be implemented in the future may be performed between the network device 101 and the terminal equipment 102. For example, such traffics may include but not limited to an enhanced mobile broadband (eMBB), massive machine type communication (MTC), and ultra-reliable and low-latency communication (URLLC), etc.

Taking beam failure recovery as an example, for example, when conditions related to beam failure detection are met, a corresponding random access procedure will be induced, and a beam failure recovery response is a corresponding random access response (RAR); that is, the beam failure recovery procedure may be understood as: a random access procedure for beam failure recovery. When a network device configures multiple carriers for a terminal equipment, it is possible that the terminal equipment is unable to determine an antenna port quasi-co-location parameter for receiving a beam failure recovery response.

Figure 2:
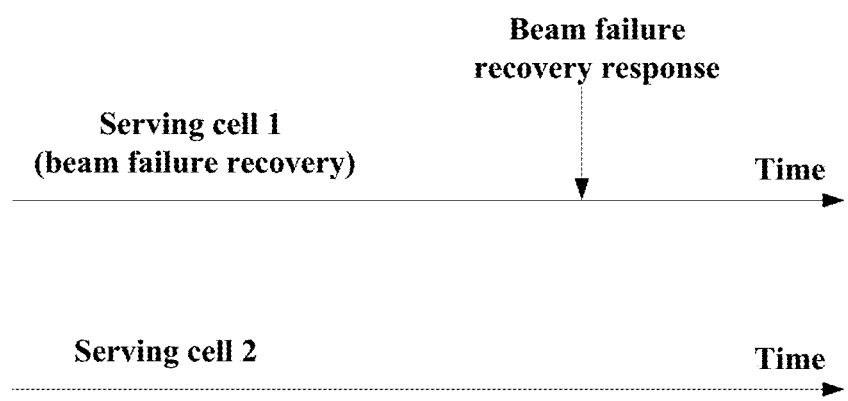
FIG. 2 is a schematic diagram of a case where a serving cell initiating a beam failure recovery procedure is identical to a serving cell receiving a beam failure recovery response.

FIG. 2 is a schematic diagram of a case where a serving cell initiating a beam failure recovery procedure is identical to a serving cell receiving a beam failure recovery response. As shown in FIG. 2, after a serving cell 1 initiates a beam failure recovery procedure, a beam failure recovery response is still received in the serving cell 1.

Figure 3:
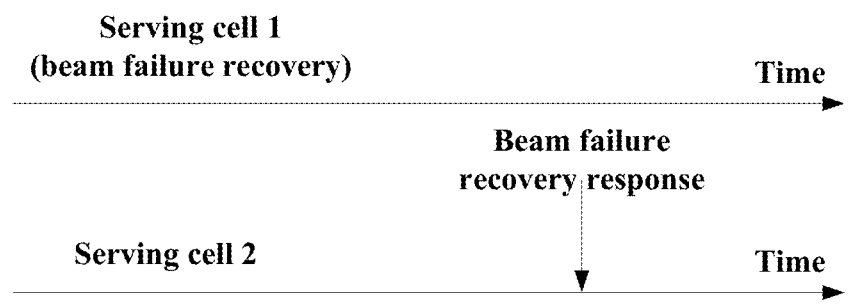
FIG. 3 is a schematic diagram of a case where a serving cell initiating a beam failure recovery procedure is different from a serving cell receiving a beam failure recovery response.

FIG. 3 is a schematic diagram of a case where a serving cell initiating a beam failure recovery procedure is different from a serving cell receiving a beam failure recovery response. As shown in FIG. 3, after the serving cell 1 initiates a beam failure recovery procedure, a beam failure recovery response may be received in a serving cell 2.

When base station spatial positions to which the serving cell 1 and the serving cell 2 correspond are different, antenna port quasi-co-location parameters of the terminal equipment for receiving random access responses to which FIG. 2 and FIG. 3 corresponds should be different. However, according to provisions of current standards, the terminal equipment is unable to distinguish scenarios to which FIG. 2 and FIG. 3 correspond. Therefore, the terminal equipment will still deal with the two scenarios in FIG. 2 and FIG. 3 by using the same antenna port quasi-co-location parameter, resulting in inability to accurately receive the random access responses.

The embodiments of this disclosure shall be described below. It should be noted that the embodiments of this disclosure are described by taking beam failure recovery response or random access response as an example. However, this disclosure is not limited thereto, and may also be applicable to other similar downlink signals. In addition, the embodiments of this disclosure are not limited to scenarios of beam failure, and are also appliable to other similar scenarios. And furthermore, a serving cell is a subset of cells, which shall not be distinguished below without causing confusion.

Embodiment 1

Figure 4:
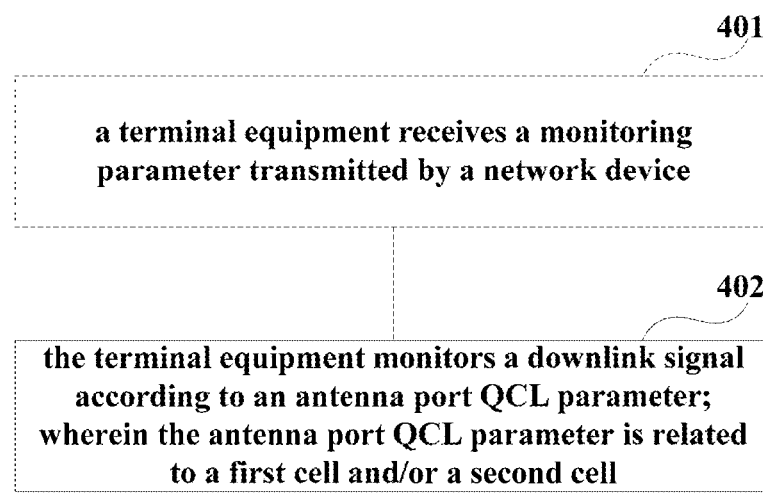
FIG. 4 is a schematic diagram of a downlink signal monitoring method of an embodiment of this disclosure.

The embodiments of this disclosure provide a downlink signal monitoring method, which shall be described from a terminal equipment side. FIG. 4 is a schematic diagram of the downlink signal monitoring method of the embodiment of this disclosure. As shown in FIG. 4, the method includes:

step 402: a terminal equipment monitors a downlink signal according to an antenna port quasi-co-location parameter; wherein the antenna port quasi-co-location parameter is related to a first cell and/or a second cell.

As shown in FIG. 4, the method may further include:

step 401: the terminal equipment receives a monitoring parameter transmitted by a network device.

In an embodiment, the first cell may include at least one of the following: a cell associated with a reference signal index corresponding to the downlink signal, a cell transmitting physical random access channel (PRACH) transmission corresponding to the downlink signal, and a cell initiating a beam failure recovery procedure corresponding to the downlink signal; however, this disclosure is not limited thereto.

In an embodiment, the second cell may include at least one of the following: a cell where a terminal equipment monitors the downlink signal, a special cell (Spcell), one or more non-special cells other than the special cell. And the special cell may include at least one of the following: a primary cell (PCell) in a master cell group (MCG) in a case of dual-connectivity, a primary cell (PSCell) in a secondary cell group (SCG) in a case of dual-connectivity, a primary cell in a case of non-dual-connectivity; however, this disclosure is not limited thereto.

For example, the reference signal index (denoted by $q_{new}$, for example) is provided by a higher layer, and is selected by the terminal equipment from a candidate beam reference signal list candidateBeamRSList configured by the higher layer; and the reference signal may include at least one of the following: a channel state information reference signal (CSI-RS), a synchronization signal (SS), and a physical broadcast channel (PBCH). The higher layer may include a media access control (MAC) layer, or a radio resource control (RRC) layer, etc.; however, this disclosure is not limited thereto.

In an embodiment, the downlink signal may include at least one of the following: a beam failure recovery response, a random access response, and downlink control information (DCI) with cyclic redundancy check (CRC) being scrambled by a cell radio network temporary identifier (C-RNTI). The downlink control information may be received in a search space (such as recoverySearchSpaceId) used for receiving a random access response of beam failure recovery (BFR RAR) configured at a higher layer; however, this disclosure is not limited there to.

Figure 5:
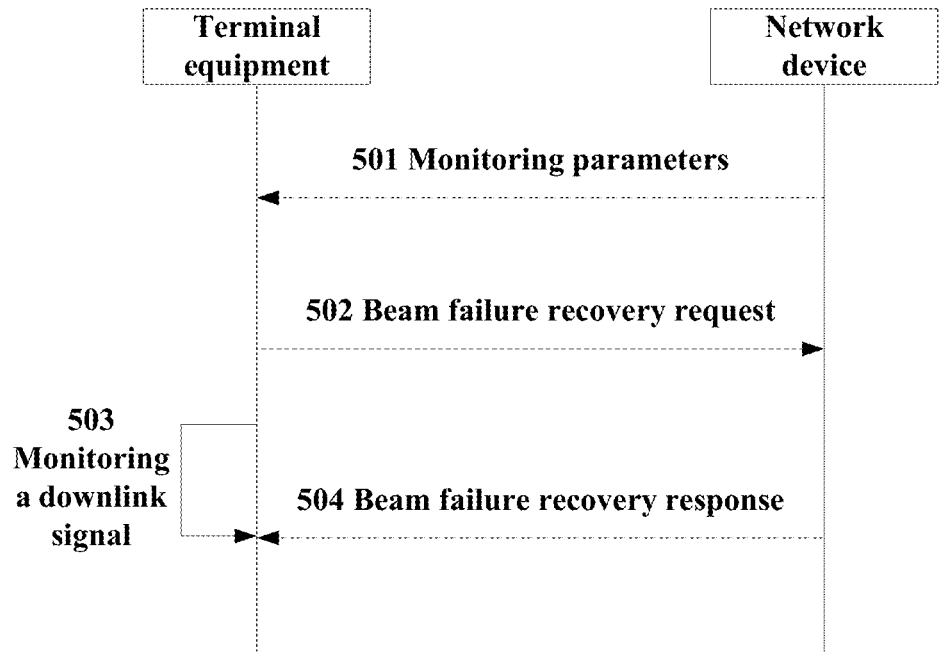
FIG. 5 is another schematic diagram of a downlink signal monitoring method of the embodiment of this disclosure.

FIG. 5 is a schematic diagram of a downlink signal monitoring method of the embodiment of this disclosure, which shall be illustrated from a terminal equipment side and a network device side by taking beam failure recovery as an example. As shown in FIG. 5, the method includes:

step 501: the terminal equipment receives monitoring parameters transmitted by the network device.

For example, the monitoring parameters may include a transmission configuration indicator (TCI) status in a control resource set (CORESET), and beam failure recovery configuration, etc., which may be configured via an RRC message. Reference may be made to related techniques for these monitoring parameters, which shall not be described herein any further.

Step 502: the terminal equipment transmits a beam failure recovery request to the network device.

For example, when the beam failure recovery procedure is initiated by a higher layer (such as an MAC layer) of the terminal equipment, the higher layer provides an index $q_{new}$ of a reference signal related to the beam failure response to which the beam failure recovery procedure corresponds. $q_{new}$ is a reference signal index selected by the higher layer from a candidate beam reference signal list (such as candidateBeamRSList) configured at the higher layer, and a serving cell associated with $q_{new}$ or a cell where the random access procedure occurs to which $q_{new}$ corresponds is c1 (a first cell). And the terminal equipment may transmit a beam failure recovery request in the serving cell c1.

Step 503: the terminal equipment monitors a downlink signal according to the antenna port quasi-co-location parameter; wherein the antenna port quasi-co-location parameter is related to the first cell and/or the second cell.

For example, if a primary serving cell (PCell) of the terminal equipment is c2 (a second cell), the terminal equipment may determine the antenna port quasi-co-location parameter according to the first cell and/or the second cell, and reference may be made to subsequent embodiments for how to determine.

Step 504: the terminal equipment receives a beam failure recovery response by using the antenna port quasi-co-location parameter.

It should be noted that FIG. 4 or 5 only schematically illustrates the embodiments of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 4 or 5.

How to determine the antenna port quasi-co-location parameter shall be described below by taking a number of embodiments as examples.

In an embodiment, in a case where the first cell and the second cell are identical, the terminal equipment monitors the downlink signal according to the antenna port quasi-co-location parameter associated with the reference signal index with which the first cell is associated.

For example, after the beam failure recovery procedure is initiated by the higher layer, the higher layer provides the reference signal index $q_{new}$ related to the beam failure response to which the beam failure recovery procedure corresponds. $q_{new}$ is a reference signal index selected by the higher layer from a candidate beam reference signal list (such as candidateBeamRSList) configured at the higher layer, and a serving cell associated with $q_{new}$ or a cell where the random access procedure occurs to which $q_{new}$ corresponds is c1. And a serving cell where the terminal equipment monitors the downlink signal is c2. If c1 and c2 are identical, or c1 is an SpCell (for example, when a serving cell monitoring the downlink signal may only be an SpCell), the terminal equipment monitors the downlink signal according to the antenna port quasi-co-location parameter with which $q_{new}$ is associated. The antenna port quasi-co-location parameter with which $q_{new}$ is associated may be understood as a corresponding reference signal in a candidate beam reference signal list indicated by $q_{new}$.

In addition, the serving cell with which $q_{new}$ is associated may be equivalent to a corresponding serving cell initiating a beam failure procedure. The serving cell with which $q_{new}$ is associated may also be equivalent to a cell transmitting corresponding beam failure report (such as a PRACH, an MAC CE).

In another embodiment, in a case where the first cell and the second cell are different and there exists no corresponding activated TCI state in a control resource set (CORESET) monitoring the downlink signal, the terminal equipment monitors the downlink signal according to the antenna port quasi-co-location parameter associated with the reference signal index with which the first cell is associated.

For example, after the beam failure recovery procedure is initiated by the higher layer, the higher layer provides the reference signal index $q_{new}$ related to the beam failure response to which the beam failure recovery procedure corresponds. $q_{new}$ is a reference signal index selected by the higher layer from a candidate beam reference signal list (such as candidateBeamRSList) configured at the higher layer, and a serving cell associated with $q_{new}$ or a cell where the random access procedure occurs to which $q_{new}$ corresponds is c1. And a serving cell where the terminal equipment monitors the downlink signal is c2. If c1 and c2 are different, or c1 is not an SpCell (for example, when a serving cell monitoring the downlink signal may only be an SpCell), and a CORESET to which monitoring the downlink signal corresponds has no activated state, the terminal equipment monitors the downlink signal according to the antenna port quasi-co-location parameter with which $q_{new}$ is associated. The antenna port quasi-co-location parameter with which $q_{new}$ is associated may be understood as a corresponding reference signal in a candidate beam reference signal list indicated by $q_{new}$.

In addition, the serving cell with which $q_{new}$ is associated may be equivalent to a corresponding serving cell initiating a beam failure procedure. The serving cell with which $q_{new}$ is associated may also be equivalent to a cell transmitting corresponding beam failure report (such as a PRACH, an MAC CE).

In a further embodiment, in a case where the first cell and the second cell are different and a higher layer configuration parameter is not configured or the parameter is configured as being in a first state, the terminal equipment monitors the downlink signal according to the antenna port quasi-co-location parameter associated with the reference signal index with which the first cell is associated.

The higher layer configuration parameter may be configured by the network device and used to acquire the antenna port quasi-co-location parameter, and the higher layer configuration parameter may be capable of being configured to be in the first state (such as a disabled state) or in the second state (such as an enabled state).

In an embodiment, the high layer configuration information may be, for example, SCell_SpCell_Diff_QCL_Flag.

For example, when the beam failure recovery procedure is initiated by the higher layer, the higher layer provides the index $q_{new}$ of the reference signal related to the beam failure response to which the beam failure recovery procedure corresponds. $q_{new}$ is a reference signal index selected by the higher layer from the higher layer configuration information candidateBeamRSList, and a serving cell associated with $q_{new}$ or a cell where the random access procedure occurs to which $q_{new}$ corresponds is c1. And a serving cell where the terminal equipment monitors the downlink signal is c2. If c1 and c2 are different, or c1 is not an SpCell (for example, when a serving cell monitoring the downlink signal may only be an SpCell) and the higher layer configuration information is configured as being disabled (for example, SCell_SpCell_Diff_QCL_Flag=disable), the terminal equipment monitors the downlink signal according to the antenna port quasi-co-location parameter with which $q_{new}$ is associated. The antenna port quasi-co-location parameter with which $q_{new}$ is associated may be understood as a corresponding reference signal in a candidate beam reference signal list indicated by $q_{new}$.

In an embodiment, when the higher layer configuration information is configured as being disabled, when the terminal equipment monitors a BFR response of the serving cell c2 and BFR responses of other serving cells than c2, it may monitor the BFR responses according to identical antenna port quasi-co-location parameters. Or, in a scenario where BFR responses are only monitored in the SpCell, when the higher layer configuration information is configured as being disabled, the terminal equipment monitors a non-SpCell BFR response and an SpCell BFR response according to identical antenna port quasi-co-location parameters.

In addition, the serving cell with which $q_{new}$ is associated may be equivalent to a corresponding serving cell initiating a beam failure procedure. The serving cell with which $q_{new}$ is associated may also be equivalent to a cell transmitting corresponding beam failure report (such as a PRACH, an MAC CE).

In yet another embodiment, in a case where the first cell and the second cell are different, the terminal equipment monitors the downlink signal according to the antenna port quasi-co-location parameter associated with the second cell.

For example, after the beam failure recovery procedure is initiated by the higher layer, the higher layer provides the reference signal index $q_{new}$ related to the beam failure response to which the beam failure recovery procedure corresponds. $q_{new}$ is a reference signal index selected by the higher layer from the higher layer configuration information candidateBeamRSList, and a serving cell associated with $q_{new}$ or a cell where the random access procedure occurs to which $q_{new}$ corresponds is c1. And a serving cell where the terminal equipment monitors the downlink signal is c2. If c1 and c2 are different, or c1 is not an SpCell (for example, when a serving cell monitoring the downlink signal may only be an SpCell), the terminal equipment may monitor the downlink signal according to the antenna port quasi-co-location parameter of the serving cell $c_2$ (or the SpCell).

In an embodiment, the antenna port quasi-co-location parameter associated with the second cell may include at least one of the following:

an antenna port quasi-co-location parameter of a reference signal associated with a physical random access channel (PRACH) transmission to which the downlink signal corresponds;

an antenna port quasi-co-location parameter used for receiving a physical downlink shared channel when an interval between downlink control information (DCI) and the physical downlink shared channel (PDSCH) scheduled by the downlink control information is less than a threshold; for example, the parameter may be: QCL parameter(s) used for PDCCH quasi co-location indication of the lowest CORESET-ID in the latest slot in which one or more CORESETs within the active BWP of the serving cell are configured for the UE;

an antenna port quasi-co-location parameter to which an activated TCI state corresponding to a control resource set (CORESET) monitoring the downlink signal corresponds;

a parameter used for physical downlink control channel (PDCCH) quasi-co-location indication (for example, QCL parameter(s) used for PDCCH quasi co-location indication of the lowest CORESET-ID in the latest slot in which one or more CORESETs within the active bandwidth part (BWP) of the serving cell are configured for the UE) within a latest slot having a lowest control resource set index in one or more control resource sets configured for the terminal equipment in an activated bandwidth part of a cell, if there exists no corresponding activated TCI state in the CORESET monitoring the downlink signal;

an antenna port quasi-co-location parameter to which an activated TCI state corresponding to CORESET monitoring the downlink signal corresponds, if there exists the corresponding activated TCI state in the CORESET monitoring the downlink signal; and a parameter used for physical downlink control channel (PDCCH) quasi-co-location indication within a latest slot having a lowest control resource set index in one or more control resource sets configured for the terminal equipment in an activated bandwidth part of a cell (for example, QCL parameter(s) used for PDCCH quasi co-location indication of the lowest CORESET-ID in the latest slot in which one or more CORESETs within the active BWP of the serving cell are configured for the UE), if there exists no corresponding activated TCI state in the control resource set monitoring the downlink signal; an antenna port quasi-co-location parameter to which an activated TCI state corresponding to the control resource set monitoring the downlink signal corresponds, if there exists the corresponding activated TCI state in the CORESET monitoring the downlink signal.

In addition, the serving cell with which $q_{new}$ is associated may be equivalent to a corresponding serving cell initiating a beam failure procedure. The serving cell with which $q_{new}$ is associated may also be equivalent to a cell transmitting corresponding beam failure report (such as a PRACH, an MAC CE).

In still another embodiment, in a case where the first cell and the second cell are different and there exists a corresponding activated transmission configuration indication (TCI) state in a control resource set (CORESET) monitoring the downlink signal, the terminal equipment monitors the downlink signal according to the antenna port quasi-co-location parameter associated with the second cell.

For example, after the beam failure recovery procedure is initiated by the higher layer, the higher layer provides the reference signal index $q_{new}$ related to the beam failure response to which the beam failure recovery procedure corresponds. $q_{new}$ is a reference signal index selected by the higher layer from the higher layer configuration information candidateBeamRSList, and a serving cell associated with $q_{new}$ or a cell where the random access procedure occurs to which $q_{new}$ corresponds is c1. And a serving cell where the terminal equipment monitors the downlink signal is c2. If c1 and c2 are different, or c1 is an SCell (for example, when a serving cell monitoring the downlink signal may only be an SpCell), and a CORESET to which monitoring the downlink signal corresponds has an activated TCI state, the terminal equipment monitors the downlink signal according to the antenna port quasi-co-location parameter of the serving cell $c_1$ (or the SpCell).

In an embodiment, the antenna port quasi-co-location parameter associated with the second cell may include at least one of the following:

an antenna port quasi-co-location parameter of a reference signal associated with a physical random access channel (PRACH) transmission to which the downlink signal corresponds;

an antenna port quasi-co-location parameter used for receiving a physical downlink shared channel (PDSCH) when an interval between DCI and the physical downlink shared channel (PDSCH) scheduled by the DCI is less than a threshold; for example, the parameter may be: QCL parameter(s) used for PDCCH quasi co-location indication of the lowest CORESET-ID in the latest slot in which one or more CORESETs within the active BWP of the serving cell are configured for the UE;

an antenna port quasi-co-location parameter to which an activated TCI state corresponding to a control resource set (CORESET) monitoring the downlink signal corresponds.

In addition, the serving cell with which $q_{new}$ is associated may be equivalent to a corresponding serving cell initiating a beam failure procedure. The serving cell with which $q_{new}$ is associated may also be equivalent to a cell transmitting corresponding beam failure report (such as a PRACH, an MAC CE).

In yet still another embodiment, in a case where the first cell and the second cell are different and the higher layer configuration parameter is not configured or the parameter is configured as being in a second state, the terminal equipment monitors the downlink signal according to the antenna port quasi-co-location parameter associated with the second cell.

For example, after the beam failure recovery procedure is initiated by the higher layer, the higher layer provides the reference signal index $q_{new}$ related to the beam failure response to which the beam failure recovery procedure corresponds. $q_{new}$ is a reference signal index selected by the higher layer from the higher layer configuration information candidateBeamRSList, and a serving cell associated with $q_{new}$ or a cell where the random access procedure occurs to which $q_{new}$ corresponds is c1. And a serving cell where the terminal equipment monitors the downlink signal is c2. If c1 and c2 are different, or c1 is not an SpCell (for example, when a serving cell monitoring the downlink signal may only be an SpCell) and the higher layer configuration information is configured as being enabled (for example, SCell_SpCell_Diff_QCL_Flag=enable), the terminal equipment monitors the downlink signal according to the antenna port quasi-co-location parameter of the serving cell $c_2$ (or the SpCell).

In an embodiment, the antenna port quasi-co-location parameter associated with the second cell may include at least one of the following:

an antenna port quasi-co-location parameter of a reference signal associated with a physical random access channel (PRACH) transmission to which the downlink signal corresponds;

an antenna port quasi-co-location parameter used for receiving a physical downlink shared channel (PDSCH) when an interval between DCI and the PDSCH scheduled by the downlink control information (DCI) is less than a threshold; for example, the parameter may be: QCL parameter(s) used for PDCCH quasi co-location indication of the lowest CORESET-ID in the latest slot in which one or more CORESETs within the active BWP of the serving cell are configured for the UE;

an antenna port quasi-co-location parameter to which an activated TCI state corresponding to a control resource set (CORESET) monitoring the downlink signal corresponds;

a parameter used for physical downlink control channel (PDCCH) quasi-co-location indication (for example, QCL parameter(s) used for PDCCH quasi co-location indication of the lowest CORESET-ID in the latest slot in which one or more CORESETs within the active BWP of the serving cell are configured for the UE) within a latest slot having a lowest control resource set index in one or more control resource sets configured for the terminal equipment in an activated bandwidth part (BWP) of a cell, if there exists no corresponding activated TCI state in the CORESET monitoring the downlink signal;

an antenna port quasi-co-location parameter to which an activated TCI state corresponding to the CORESET monitoring the downlink signal corresponds, if there exists the corresponding activated TCI state in the CORESET monitoring the downlink signal; and a parameter used for physical downlink control channel (PDCCH) quasi-co-location indication within a latest slot having a lowest control resource set index in one or more control resource sets configured for the terminal equipment in an activated bandwidth part of a cell (for example, QCL parameter(s) used for PDCCH quasi co-location indication of the lowest CORESET-ID in the latest slot in which one or more CORESETs within the active BWP of the serving cell are configured for the UE), if there exists no corresponding activated TCI state in the control resource set monitoring the downlink signal; an antenna port quasi-co-location parameter to which an activated TCI state corresponding to the control resource set monitoring the downlink signal corresponds, if there exists the corresponding activated TCI state in the CORESET monitoring the downlink signal.

In an embodiment, when the higher layer configuration information is configured as being enabled, and the terminal equipment may monitor the BFR response of the serving cell c2 and the BFR responses of other serving cells than c2 by using different antenna port quasi-co-location parameters. Or, in a scenario where the beam failure recovery response is only monitored in an SpCell, when the higher layer configuration information is configured as being enabled, the terminal device monitors the non-SpCell BFR responses and SpCell BFR responses according to different antenna port quasi-co-location parameters.

In addition, the serving cell with which $q_{new}$ is associated may be equivalent to a corresponding serving cell initiating a beam failure procedure. The serving cell with which $q_{new}$ is associated may also be equivalent to a cell transmitting corresponding beam failure report (such as a PRACH, an MAC CE).

The above embodiments or implementations only illustrate the embodiment of this disclosure. However, this disclosure is not limited thereto, and appropriate variants may be made on the basis of these implementation. For example, the above embodiments or implementations may be executed separately, or one or more of them may be executed in a combined manner.

It can be seen from the above embodiments that the terminal equipment monitors a downlink signal according to an antenna port quasi-co-location parameter; wherein the antenna port quasi-co-location parameter is related to a first cell and/or a second cell. Hence, even though a network device configures multiple carriers for the terminal equipment, the terminal equipment may be able to accurately determine an antenna port quasi-co-location parameter for receiving a downlink signal, thereby correctly receiving downlink signals.

Embodiment 2

The embodiments of this disclosure provide a downlink signal transmitting method, which shall be described from a network device side, with contents identical to those in Embodiment 1 being not going to be described herein any further.

Figure 6:
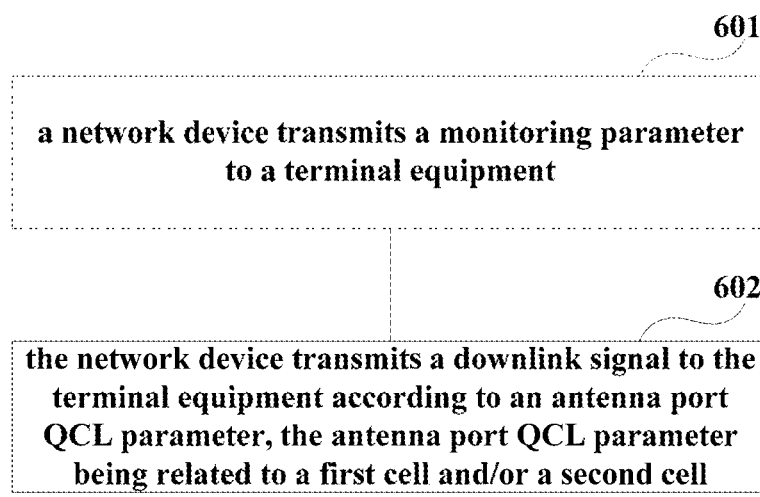
FIG. 6 is a schematic diagram of a downlink signal transmitting method of an embodiment of this disclosure.

FIG. 6 is a schematic diagram of the downlink signal transmitting method of the embodiment of this disclosure, in which a case at the network device side is shown. As shown in FIG. 6, the method includes:

step 602: a network device transmits a downlink signal to a terminal equipment according to an antenna port quasi-co-location parameter; wherein the antenna port quasi-co-location parameter is related to a first cell and/or a second cell.

As shown in FIG. 6, the method may further include:

step 601: the network device transmits a monitoring parameter to the terminal equipment, the higher layer configuration parameter being used to indicate the terminal equipment to acquire the antenna port quasi-co-location parameter.

In an embodiment, the network device may further transmit information used for indicating a higher layer configuration parameter to the terminal equipment, the higher layer configuration parameter indicating the terminal equipment to acquire the antenna port quasi-co-location parameter.

In an embodiment, the first cell may include at least one of the following: a cell associated with a reference signal index corresponding to the downlink signal, a cell receiving a physical random access channel (PRACH) signal corresponding to the downlink signal, and a cell initiating a beam failure recovery procedure corresponding to the downlink signal; however, this disclosure is not limited thereto.

In an embodiment, the second cell may include at least one of the following: a cell where the network device transmits the downlink signal, a special cell (Spcell), and non-special cells other than the special cell. And the special cell may include at least one of the following: a primary cell (PCell) in a master cell group (MCG) in a case of dual-connectivity, a primary cell (PSCell) in a secondary cell group (SCG) in a case of dual-connectivity, and a primary cell in a case of non-dual-connectivity; however, this disclosure is not limited thereto.

In an embodiment, how the antenna port quasi-co-location parameter is related to a first cell and/or a second cell, and a definition of the downlink signal, etc., are identical to those in Embodiment 1.

It should be noted that FIG. 6 only schematically illustrates the embodiment of this disclosure; however, this disclosure is not limited thereto. For example, an order of execution of the steps may be appropriately adjusted, and furthermore, some other steps may be added, or some steps therein may be reduced; for example, steps 601 and 602 may be combined into one step. And appropriate variants may be made by those skilled in the art according to the above contents, without being limited to what is contained in FIG. 6.

It can be seen from the above embodiments that the network device transmits a downlink signal to the terminal equipment according to an antenna port quasi-co-location parameter; wherein the antenna port quasi-co-location parameter is related to a first cell and/or a second cell. Hence, even though a network device configures multiple carriers for the terminal equipment, the network device may be able to accurately determine an antenna port quasi-co-location parameter for transmitting a downlink signal, thereby correctly transmitting downlink signals.

Embodiment 3

The embodiments of this disclosure provide a higher layer parameter configuration method, which shall be described from a network device side, with contents identical to those in embodiments 1 and 2 being not going to be described herein any further.

Figure 7:
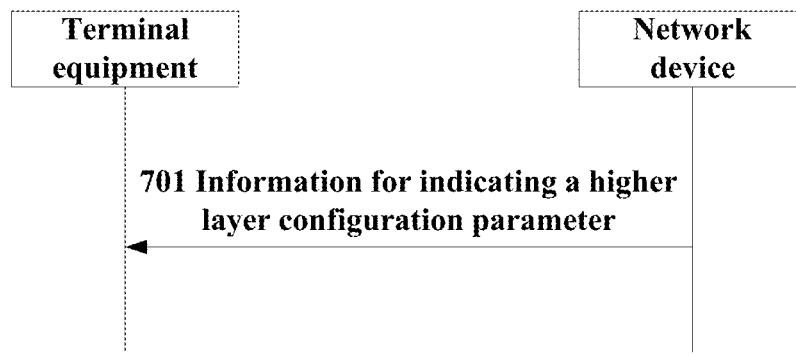
FIG. 7 is a schematic diagram of a higher layer parameter configuration method of an embodiment of this disclosure.

FIG. 7 is a schematic diagram of a higher layer parameter configuration method of the embodiment of this disclosure, in which a case at the network device side is shown. As shown in FIG. 7, the method includes:

step 701: a network device transmits information for indicating a higher layer configuration parameter to a terminal equipment, the higher layer configuration parameter being used to indicate the terminal equipment to acquire an antenna port quasi-co-location parameter.

In an embodiment, when the higher layer configuration parameter is not configured or the parameter is configured as being in a first state (such as a disabled state), the higher layer configuration parameter indicates the terminal equipment to use identical quasi-co-location parameters to monitor the downlink signals of the first cell and the second cell.

For example, the higher layer configuration parameter indicates the terminal equipment to use an antenna port quasi-co-location parameter associated with a reference signal index with which the first cell is associated to monitor the downlink signal of the first cell and the downlink signal of the second cell.

In an embodiment, when the higher layer configuration parameter is not configured or the parameter is configured as being in a second state (such as an enabled state), the higher layer configuration parameter indicates the terminal equipment to use different quasi-co-location parameters to monitor the downlink signals of the first cell and the second cell.

For example, the higher layer configuration parameter indicates the terminal equipment to use an antenna port quasi-co-location parameter associated with a reference signal index with which the first cell is associated to monitor the downlink signal of the first cell, and indicates the terminal equipment to use an antenna port quasi-co-location parameter associated with the second cell to monitor the downlink signal of the second cell.

In an embodiment, the higher layer configuration parameter may be included in a beam failure recovery configuration of a cell, or is only configured in a beam failure recovery configuration of a primary cell; however, this disclosure is not limited thereto.

For example, the higher layer configuration parameter may be configured in BeamFailureRecoveryConfig in BWP-UplinkDedicated, or may be configured in BeamFailureRecoveryConfig in BWP-UplinkDedicated in an SpCell.

In an embodiment, the first cell may include at least one of the following: a cell associated with a reference signal index corresponding to the downlink signal, a cell transmitting a physical random access channel transmission corresponding to the downlink signal, a cell initiating a beam failure recovery procedure corresponding to the downlink signal.

In an embodiment, the second cell may include at least one of the following: a cell where the terminal equipment monitors the downlink signal, a special cell, non-special cells other than the special cell. And the special cell may include at least one of the following: a primary cell (PCell) in a master cell group (MCG) in a case of dual-connectivity, a primary cell (PSCell) in a secondary cell group (SCG) in a case of dual-connectivity, a primary cell in a case of non-dual-connectivity.

The above embodiments or implementations only illustrate the embodiment of this disclosure. However, this disclosure is not limited thereto, and appropriate variants may be made on the basis of these implementation. For example, the above embodiments or implementations may be executed separately, or one or more of them may be executed in a combined manner.

It can be seen from the above embodiments that the network device configured the terminal equipment with the higher layer configuration parameter, so that the terminal equipment monitors the downlink signal according to an antenna port quasi-co-location parameter; wherein the antenna port quasi-co-location parameter is related to a first cell and/or a second cell. Hence, even though the network device configures multiple carriers for the terminal equipment, the terminal equipment may be able to accurately determine an antenna port quasi-co-location parameter for receiving a downlink signal, thereby correctly receiving downlink signals.

Embodiment 4

The embodiments of this disclosure provide a downlink signal monitoring method, which shall be described from a terminal equipment side, with contents identical to those in Embodiment 1 being not going to be described herein any further.

Figure 8:
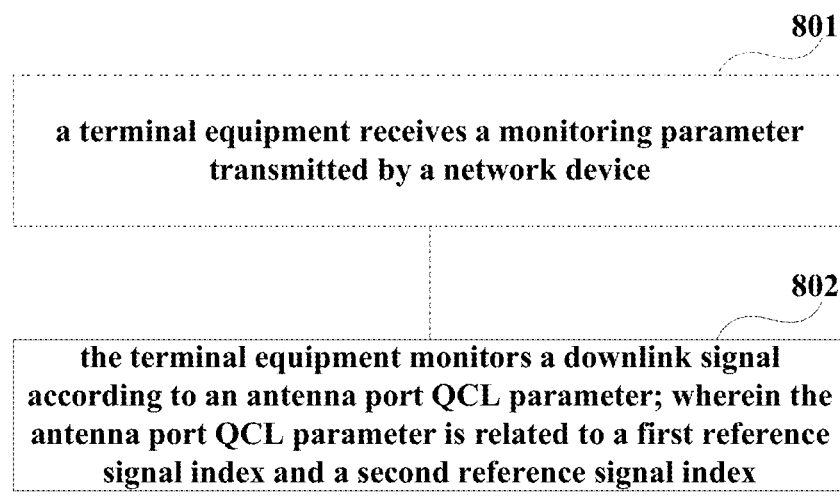
FIG. 8 is a schematic diagram of a downlink signal monitoring method of an embodiment of this disclosure.

FIG. 8 is a schematic diagram of the downlink signal monitoring method of the embodiment of this disclosure, in which a case at the terminal equipment side is shown. As shown in FIG. 8, the method includes:

step 801: a terminal equipment receives a monitoring parameter transmitted by a network device; and step 802: the terminal equipment monitors a downlink signal according to an antenna port quasi-co-location parameter; wherein the antenna port quasi-co-location parameter is related to a first reference signal index and a second reference signal index.

It should be noted that FIG. 8 only schematically illustrates the embodiment of this disclosure; however, this disclosure is not limited thereto. For example, an order of execution of the steps may be appropriately adjusted, and furthermore, some other steps may be added, or some steps therein may be reduced8. And appropriate variants may be made by those skilled in the art according to the above contents, without being limited to what is contained in FIG. 8.

In an embodiment, the first reference signal index is selected by the terminal equipment from a candidate beam parameter list configured by a higher layer.

For example, when a beam failure recovery procedure is initiated by the higher layer, the higher layer provides an index $q_{new}$ of a reference signal related to a beam failure response corresponding to the beam failure recovery procedure. $q_{new}$ is a reference signal index selected by the higher layer from a candidate beam list configuration information (such as candidateBeamRSList) of a corresponding random access procedure performed for beam failure recovery.

In an embodiment, the second reference signal index is selected by the terminal equipment from transmission configuration indication state configuration information.

For example, when the beam failure recovery procedure is initiated by the higher layer, the higher layer may provide an index q' related to the beam failure recovery procedure. q' may be a reference signal index selected from higher layer configuration information (such as tci-StatesToAddModList) of a candidate TCI state list for a PDSCH configured by the higher layer on a BWP monitoring a reference downlink signal; and q' may also be a reference signal index selected from higher layer configuration information (such as tci-StatesPDCCH-ToAddList, tci-States PDCCH-ToReleaseList) on a TCI state list configured by the higher layer for a CORESET monitoring the downlink signal.

In an embodiment, when the second reference signal index is provided, the terminal equipment monitors the downlink signal according to the antenna port quasi-co-location parameter associated with the second reference signal index; otherwise, the terminal equipment monitors the downlink signal according to the antenna port quasi-co-location parameter associated with the first reference signal index.

For example, when q' and $q_{new}$ are provided by the higher layer at the same time, the terminal equipment monitors the downlink signal according to the antenna port quasi-co-location parameter associated with q'; and when q' is provided by the higher layer and $q_{new}$ is not provided by the higher layer, the terminal equipment monitors the downlink signal according to the antenna port quasi-co-location parameter associated with $q_{new}$.

In another embodiment, when the second reference signal index is of a specific value, the terminal equipment monitors the downlink signal according to the antenna port quasi-co-location parameter associated with the second reference signal index; otherwise, the terminal equipment monitors the downlink signal according to the antenna port quasi-co-location parameter associated with the first reference signal index.

For example, when q' is of a specific value (such as 0, 1, 2 or other values), the terminal equipment monitors the downlink signal according to the antenna port quasi-co-location parameter associated with q'; and when q' is not of a specific value, the terminal equipment monitors the downlink signal according to the antenna port quasi-co-location parameter associated with $q_{new}$.

It can be seen from the above embodiments that the terminal equipment monitors a downlink signal according to an antenna port quasi-co-location parameter; wherein the antenna port quasi-co-location parameter is related to a first reference signal index and a second reference signal index. Hence, even though a network device configures multiple carriers for the terminal equipment, the terminal equipment may be able to accurately determine an antenna port quasi-co-location parameter for receiving a downlink signal, thereby correctly receiving downlink signals.

Embodiment 5

The embodiments of this disclosure provide a downlink signal transmitting method, which shall be described from a network device side, with contents identical to those in Embodiment 4 being not going to be described herein any further.

Figure 9:
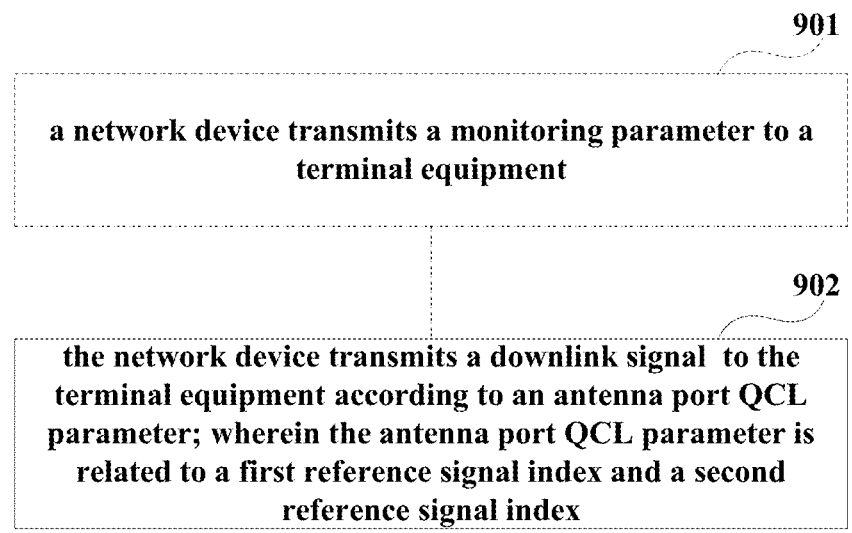
FIG. 9 is a schematic diagram of a downlink signal transmitting method of an embodiment of this disclosure.

FIG. 9 is a schematic diagram of a downlink signal transmitting method of the embodiment of this disclosure, in which a case at the network device side is shown. As shown in FIG. 9, the method includes:

step 902: a network device transmits a downlink signal to a terminal equipment according to an antenna port quasi-co-location parameter; wherein the antenna port quasi-co-location parameter is related to a first reference signal index and a second reference signal index.

As shown in FIG. 9, the method may further include:

step 901: the network device transmits a monitoring parameter to the terminal equipment.

It should be noted that FIG. 9 only schematically illustrates the embodiment of this disclosure; however, this disclosure is not limited thereto. For example, an order of execution of the steps may be appropriately adjusted, and furthermore, some other steps may be added, or some steps therein may be reduced8. And appropriate variants may be made by those skilled in the art according to the above contents, without being limited to what is contained in FIG. 9.

In an embodiment, the first reference signal index is selected by the terminal equipment from a candidate beam parameter list configured by a higher layer.

In an embodiment, the second reference signal index is selected by the terminal equipment from transmission configuration indication state configuration information. For example, the transmission configuration indication state configuration information is transmission configuration indication state configuration information to which a control resource set monitoring the downlink signal corresponds.

It can be seen from the above embodiments that the network device transmits a downlink signal to the terminal equipment according to an antenna port quasi-co-location parameter; wherein the antenna port quasi-co-location parameter is related to a first reference signal index and/or a second reference signal index. Hence, even though the network device configures multiple carriers for the terminal equipment, the network device may be able to accurately determine an antenna port quasi-co-location parameter for transmitting a downlink signal, thereby correctly transmitting downlink signals.

Embodiment 6

The embodiments of this disclosure provide a downlink signal monitoring apparatus. The apparatus may be, for example, a terminal equipment, and may also be one or more components or assemblies configured in a terminal equipment. Contents in the embodiments identical to those in Embodiment 1 shall not be described herein any further.

Figure 10:
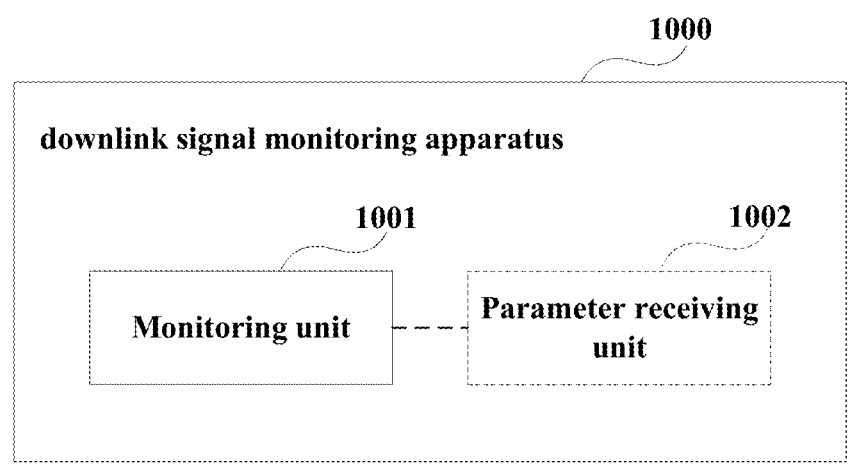
FIG. 10 is a schematic diagram of a downlink signal monitoring apparatus of an embodiment of this disclosure.

FIG. 10 is a schematic diagram of the downlink signal monitoring apparatus of the embodiment of this disclosure. As shown in FIG. 10, a downlink signal monitoring apparatus 1000 includes:

a monitoring unit 1001 configured to monitor a downlink signal according to an antenna port quasi-co-location parameter; wherein the antenna port quasi-co-location parameter is related to a first cell and/or a second cell.

As shown in FIG. 10, the downlink signal monitoring apparatus 1000 may further include:

a parameter receiving unit 1002 configured to receive a monitoring parameter transmitted by a network device.

In an embodiment, the first cell includes at least one of the following: a cell associated with a reference signal index corresponding to the downlink signal, a cell transmitting physical random access channel transmission corresponding to the downlink signal, a cell initiating a beam failure recovery procedure corresponding to the downlink signal;

In an embodiment, the second cell includes at least one of the following: a cell where a terminal equipment monitors the downlink signal, a special cell, one or more non-special cells other than the special cell. The special cell includes at least one of the following: a primary cell in a master cell group in a case of dual-connectivity, a primary cell in a secondary cell group in a case of dual-connectivity, a primary cell in a case of non-dual-connectivity.

In an embodiment, the reference signal index is provided by a higher layer, and is selected by the terminal equipment from a candidate beam reference signal list configured by the higher layer; and the reference signal includes at least one of the following: a channel state information reference signal, a synchronization signal, a physical broadcast channel.

In an embodiment, in a case where the first cell and the second cell are identical, the monitoring unit 1001 monitors the downlink signal according to the antenna port quasi-co-location parameter associated with the reference signal index with which the first cell is associated.

In an embodiment, in a case where the first cell and the second cell are different, the monitoring unit 1001 monitors the downlink signal according to the antenna port quasi-co-location parameter associated with the second cell.

In an embodiment, in a case where the first cell and the second cell are different and there exists no corresponding activated transmission configuration indication state in a control resource set monitoring the downlink signal, the monitoring unit 1001 monitors the downlink signal according to the antenna port quasi-co-location parameter associated with the reference signal index with which the first cell is associated.

In an embodiment, in a case where the first cell and the second cell are different and there exists a corresponding activated transmission configuration indication state in a control resource set monitoring the downlink signal, the monitoring unit 1001 monitors the downlink signal according to the antenna port quasi-co-location parameter associated with the second cell.

In an embodiment, in a case where the first cell and the second cell are different and a higher layer configuration parameter is not configured or the parameter is configured as being in a first state, the monitoring unit 1001 monitors the downlink signal according to the antenna port quasi-co-location parameter associated with the reference signal index with which the first cell is associated.

In an embodiment, in a case where the first cell and the second cell are different and the higher layer configuration parameter is not configured or the parameter is configured as being in a second state, the monitoring unit 1001 monitors the downlink signal according to the antenna port quasi-co-location parameter associated with the second cell.

In an embodiment, the parameter receiving unit 1002 may further be configured to receive information indicating the higher layer configuration parameter transmitted by a network device. The higher layer configuration parameter is configured by the network device and is used to acquire the quasi-co-location parameter, and the higher layer configuration parameter is capable of being configured to be in the first state or in the second state.

In an embodiment, the higher layer configuration parameter is included in a beam failure recovery configuration of a cell, or is only configured in a beam failure recovery configuration of a primary cell.

In an embodiment, the antenna port quasi-co-location parameter associated with the second cell may include at least one of the following:

an antenna port quasi-co-location parameter of a reference signal associated with a physical random access channel transmission to which the downlink signal corresponds;

an antenna port quasi-co-location parameter used for receiving a physical downlink shared channel when an interval between downlink control information and the physical downlink shared channel scheduled by the downlink control information is less than a threshold;

an antenna port quasi-co-location parameter to which an activated transmission configuration indication state corresponding to a control resource set monitoring the downlink signal corresponds;

a parameter used for physical downlink control channel quasi-co-location indication within a latest slot having a lowest control resource set index in one or more control resource sets configured for the terminal equipment in an activated bandwidth part of a cell, if there exists no corresponding activated transmission configuration indication state in the control resource set monitoring the downlink signal;

an antenna port quasi-co-location parameter to which an activated transmission configuration indication state corresponding to the control resource set monitoring the downlink signal corresponds, if there exists the corresponding activated transmission configuration indication state in the control resource set monitoring the downlink signal; and a parameter used for physical downlink control channel quasi-co-location indication within a latest slot having a lowest control resource set index in one or more control resource sets configured for the terminal equipment in an activated bandwidth part of a cell, if there exists no corresponding activated transmission configuration indication state in the control resource set monitoring the downlink signal; an antenna port quasi-co-location parameter to which an activated transmission configuration indication state corresponding to the control resource set monitoring the downlink signal corresponds, if there exists the corresponding activated transmission configuration indication state in the control resource set monitoring the downlink signal.

It should be noted that the components or modules related to this disclosure are only described above. However, this disclosure is not limited thereto, and the downlink signal monitoring apparatus 1000 may further include other components or modules, and reference may be made to related techniques for particulars of these components or modules.

Furthermore, for the sake of simplicity, connection relationships between the components or modules or signal profiles thereof are only illustrated in FIG. 10. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the terminal equipment monitors a downlink signal according to an antenna port quasi-co-location parameter; wherein the antenna port quasi-co-location parameter is related to a first cell and/or a second cell. Hence, even though a network device configures multiple carriers for the terminal equipment, the terminal equipment may be able to accurately determine an antenna port quasi-co-location parameter for receiving a downlink signal, thereby correctly receiving downlink signals.

Embodiment 7

The embodiments of this disclosure provide a downlink signal transmitting apparatus. The apparatus may be, for example, a network device, or one or more components or assemblies configured in a network device. Contents in the embodiments identical to those in embodiments 2 and 3 shall not be described herein any further.

Figure 11:
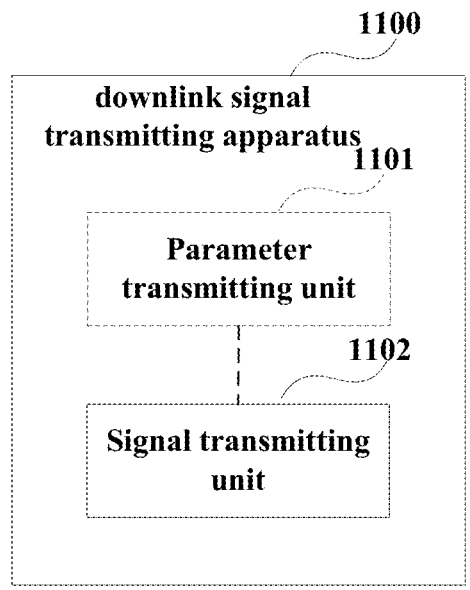
FIG. 11 is a schematic diagram of a downlink signal transmitting apparatus of an embodiment of this disclosure.

FIG. 11 is a schematic diagram of a downlink signal transmitting apparatus of the embodiment of this disclosure. As shown in FIG. 11, a downlink signal transmitting apparatus 1100 includes:

a signal transmitting unit 1102 configured to transmit a downlink signal to a terminal equipment according to an antenna port quasi-co-location parameter.

As shown in FIG. 11, the downlink signal transmitting apparatus 1100 may further include:

a parameter transmitting unit 1101 configured to transmit a monitoring parameter used for monitoring the downlink signal to the terminal equipment, the higher layer configuration parameter being used to indicate the terminal equipment to monitor a downlink signal according to the antenna port quasi-co-location parameter; wherein the antenna port quasi-co-location parameter is related to a first cell and/or a second cell.

In an embodiment, the parameter transmitting unit 1101 may further be configured to transmit information used for indicating a higher layer configuration parameter to the terminal equipment, the higher layer configuration parameter being used to indicate the terminal equipment to acquire the antenna port quasi-co-location parameter.

In an embodiment, when the higher layer configuration parameter is not configured or the parameter is configured as being in a first state, the higher layer configuration parameter indicates the terminal equipment to use identical quasi-co-location parameters to monitor the downlink signals of the first cell and the second cell.

For example, the higher layer configuration parameter indicates the terminal equipment to use an antenna port quasi-co-location parameter associated with a reference signal index with which the first cell is associated to monitor the downlink signal of the first cell and the downlink signal of the second cell.

In an embodiment, when the higher layer configuration parameter is not configured or the parameter is configured as being in a second state, the higher layer configuration parameter indicates the terminal equipment to use different quasi-co-location parameters to monitor the downlink signals of the first cell and the second cell.

For example, the higher layer configuration parameter indicates the terminal equipment to use an antenna port quasi-co-location parameter associated with a reference signal index with which the first cell is associated to monitor the downlink signal of the first cell, and indicates the terminal equipment to use an antenna port quasi-co-location parameter associated with the second cell to monitor the downlink signal of the second cell.

It should be noted that the components or modules related to this disclosure are only described above. However, this disclosure is not limited thereto, and the downlink signal transmitting apparatus 1100 may further include other components or modules, and reference may be made to related techniques for particulars of these components or modules.

Furthermore, for the sake of simplicity, connection relationships between the components or modules or signal profiles thereof are only illustrated in FIG. 11. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the network device transmits a downlink signal to the terminal equipment according to an antenna port quasi-co-location parameter; wherein the antenna port quasi-co-location parameter is related to a first cell and/or a second cell. Hence, even though a network device configures multiple carriers for the terminal equipment, the network device may be able to accurately determine an antenna port quasi-co-location parameter for transmitting a downlink signal, thereby correctly transmitting downlink signals.

Embodiment 8

The embodiments of this disclosure provide a downlink signal monitoring apparatus. The apparatus may be, for example, a terminal equipment, or one or more components or assemblies configured in a terminal equipment. Contents in the embodiments identical to those in Embodiment 3 shall not be described herein any further.

In an embodiment, reference may be made to FIG. 10 for a structure of the downlink signal monitoring apparatus. As shown in FIG. 10, the monitoring unit 1001 monitors a downlink signal according to an antenna port quasi-co-location parameter, the antenna port quasi-co-location parameter being related to a first reference signal index and a second reference signal index.

In an embodiment, the first reference signal index is selected by a terminal equipment from a candidate beam parameter list configured by a higher layer, and the second reference signal index is selected by the terminal equipment from transmission configuration indication state configuration information. For example, the candidate transmission configuration indication state configuration information is transmission configuration indication state configuration information on an activated bandwidth part of a cell monitoring the downlink signal.

In an embodiment, in a case where the second reference signal index is provided, the monitoring unit 1001 monitors the downlink signal according to the antenna port quasi-co-location parameter with which the second reference signal index is associated, otherwise, monitors the downlink signal according to the antenna port quasi-co-location parameter with which the first reference signal index is associated.

In an embodiment, in a case where the second reference signal index is a specific value, the monitoring unit 1001 monitors the downlink signal according to the antenna port quasi-co-location parameter with which the second reference signal index is associated, otherwise, monitors the downlink signal according to the antenna port quasi-co-location parameter with which the first reference signal index is associated.

It should be noted that the components or modules related to this disclosure are only described above. However, this disclosure is not limited thereto, and the downlink signal monitoring apparatus 1000 may further include other components or modules, and reference may be made to related techniques for particulars of these components or modules.

It can be seen from the above embodiments that the terminal equipment monitors a downlink signal according to an antenna port quasi-co-location parameter; wherein the antenna port quasi-co-location parameter is related to a first reference signal index and/or a second reference signal index. Hence, even though a network device configures multiple carriers for the terminal equipment, the terminal equipment may be able to accurately determine an antenna port quasi-co-location parameter for receiving a downlink signal, thereby correctly receiving downlink signals.

Embodiment 9

The embodiments of this disclosure provide a downlink signal transmitting apparatus. The apparatus may be, for example, a network device, or one or more components or assemblies configured in a t network device. Contents in the embodiments identical to those in Embodiment 5 shall not be described herein any further.

In an embodiment, reference may be made to FIG. 11 for a structure of the downlink signal transmitting apparatus. As shown in FIG. 11, the parameter transmitting unit 1101 is further configured to transmit a monitoring parameter used for monitoring the downlink signal to the terminal equipment, the monitoring parameter being used for indicating the terminal equipment to monitor the downlink signal according to an antenna port quasi-co-location parameter; and the signal transmitting unit 1102 is further configured to transmit the downlink signal to the terminal equipment according to the antenna port quasi-co-location parameter, the antenna port quasi-co-location parameter being related to a first reference signal index and a second reference signal index.

In an embodiment, the first reference signal index is selected by the terminal equipment from a candidate beam parameter list configured by a higher layer, and the second reference signal index is selected by the terminal equipment from a candidate transmission configuration indication state configuration information. For example, the candidate transmission configuration indication state configuration information is transmission configuration indication state configuration information on an activated bandwidth part of a cell monitoring the downlink signal.

It should be noted that the components or modules related to this disclosure are only described above. However, this disclosure is not limited thereto, and the downlink signal transmitting apparatus 1100 may further include other components or modules, and reference may be made to related techniques for particulars of these components or modules.

It can be seen from the above embodiments that the network device transmits a downlink signal to the terminal equipment according to an antenna port quasi-co-location parameter; wherein the antenna port quasi-co-location parameter is related to a first reference signal index and/or a second reference signal index. Hence, even though the network device configures multiple carriers for the terminal equipment, the network device may be able to accurately determine an antenna port quasi-co-location parameter for transmitting a downlink signal, thereby correctly transmitting downlink signals.

Embodiment 10

The embodiments of this disclosure provide a communication system, and reference may be made to FIG. 1, with contents identical to those in embodiments 1-9 being not going to be described herein any further. In an embodiment, a communication system 100 may include:

a terminal equipment 102 configured with the downlink signal monitoring apparatus 1000 as described in Embodiment 6 or 8; and a network device 101 configured with the downlink signal transmitting apparatus 1100 as described in Embodiment 7 or 9.

The embodiment of this disclosure further provides a network device, which may be, for example, a base station. However, this disclosure is not limited thereto, and it may also be another network device.

Figure 12:
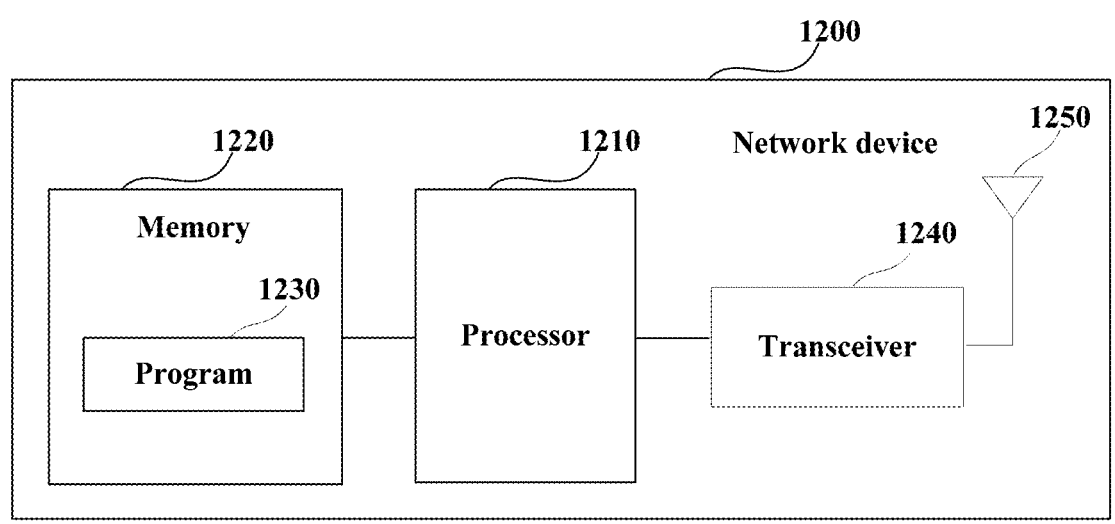
FIG. 12 is a schematic diagram of a network device of an embodiment of this disclosure.

FIG. 12 is a schematic diagram of a structure of a network device of the embodiment of this disclosure. As shown in FIG. 12, a network device 1200 may include a processor 1210 (such as a central processing unit (CPU)) and a memory 1220, the memory 1220 being coupled to the processor 1210. The memory 1220 may store various data, and furthermore, it may store a program 1230 for data processing, and execute the program 1230 under control of the processor 1210.

For example, the processor 1210 may be configured to execute a program to carry out the downlink signal transmitting method as described in Embodiment 2. For example, the processor 1210 may be configured to for perform the following control: transmitting a downlink signal to a terminal equipment according to an antenna port quasi-co-location parameter; wherein the antenna port quasi-co-location parameter is related to a first cell and/or a second cell.

For another example, the processor 1210 may be configured to execute a program to carry out the higher layer parameter configuration method as described in Embodiment 3. For example, the processor 1210 may be configured to for perform the following control: transmitting information for indicating a higher layer configuration parameter to a terminal equipment, the higher layer configuration parameter being used to indicate the terminal equipment to acquire an antenna port quasi-co-location parameter.

For a further example, the processor 1210 may be configured to execute a program to carry out the downlink signal transmitting method as described in Embodiment 5. For example, the processor 1210 may be configured to for perform the following control: transmitting a downlink signal to a terminal equipment according to an antenna port quasi-co-location parameter; wherein the antenna port quasi-co-location parameter is related to a first reference signal index and a second reference signal index.

Furthermore, as shown in FIG. 12, the network device 1200 may include a transceiver 1240, and an antenna 1250, etc. Functions of the above components are similar to those in the relevant art, and shall not be described herein any further. It should be noted that the network device 1200 does not necessarily include all the parts shown in FIG. 12, and furthermore, the network device 1200 may include parts not shown in FIG. 12, and the relevant art may be referred to.

The embodiment of this disclosure further provides a terminal equipment, however, this disclosure is not limited thereto, and it may also be another equipment.

Figure 13:
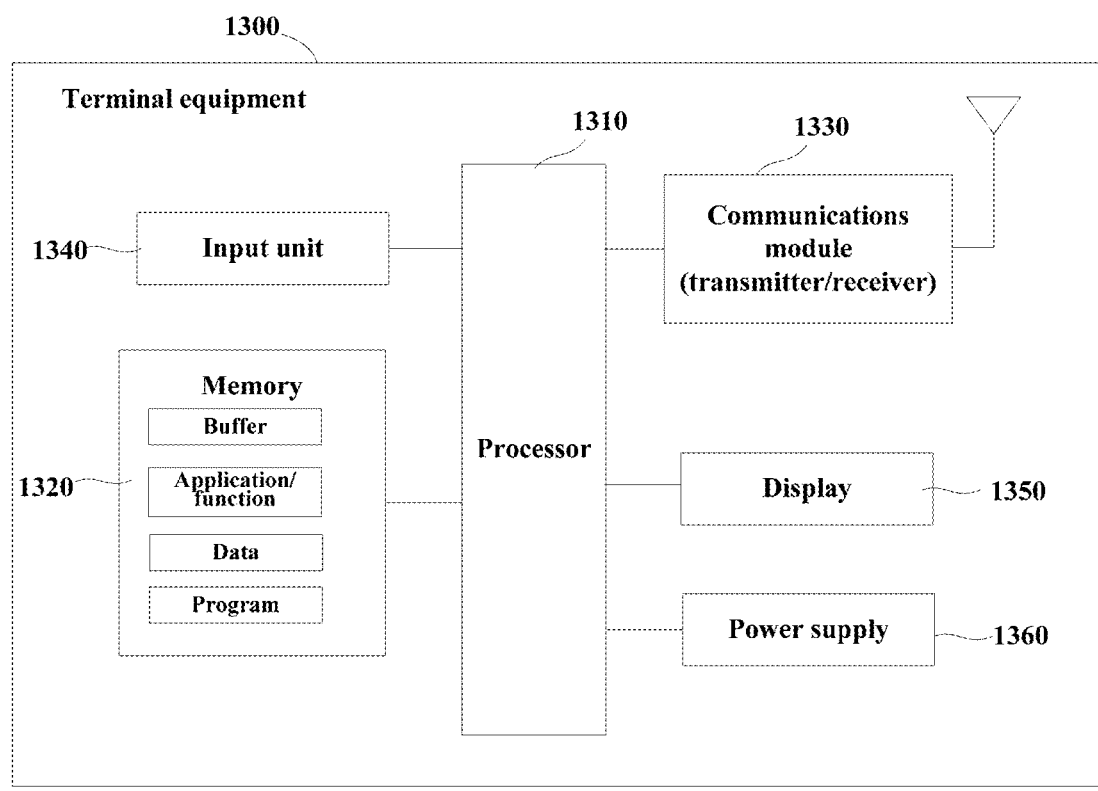
FIG. 13 is a schematic diagram of a terminal equipment of an embodiment of this disclosure.

FIG. 13 is a schematic diagram of a terminal equipment of the embodiment of this disclosure. As shown in FIG. 13, a terminal equipment 1300 may include a processor 1310 and a memory 1320, the memory 1320 storing data and a program and being coupled to the processor 1310. It should be noted that his figure is illustrative only, and other types of structures may also be used, so as to supplement or replace this structure and achieve a telecommunications function or other functions.

For example, the processor 1310 may be configured to execute a program to carry out the downlink signal monitoring method as described in Embodiment 1. For example, the processor 1310 may be configured to execute the following control: monitoring a downlink signal according to an antenna port quasi-co-location parameter; wherein the antenna port quasi-co-location parameter is related to a first cell and/or a second cell.

For another example, the processor 1310 may be configured to execute the program to carry out the downlink signal monitoring method described in Embodiment 4. For example, the processor 1310 may be configured to execute the following control: monitoring a downlink signal according to an antenna port quasi-co-location parameter; wherein the antenna port quasi-co-location parameter is related to a first reference signal index and a second reference signal index.

As shown in FIG. 13, the terminal equipment 1300 may further include a communication module 1330, an input unit 1340, a display 1350, and a power supply 1360; functions of the above components are similar to those in the relevant art, which shall not be described herein any further. It should be noted that the terminal equipment 1300 does not necessarily include all the parts shown in FIG. 13, and the above components are not necessary. Furthermore, the terminal equipment 1300 may include parts not shown in FIG. 13, and the relevant art may be referred to.

An embodiment of the present disclosure provides a computer readable program code, which, when executed in a network device, will cause the network device to carry out the downlink signal transmitting method described in Embodiment 2 or 5 or the higher layer parameter configuration method described in Embodiment 4.

An embodiment of this disclosure provides a computer storage medium, including a computer readable program code, which will cause a network device to carry out the downlink signal transmitting method described in Embodiment 2 or 5 or the higher layer parameter configuration method described in Embodiment 4.

An embodiment of the present disclosure provides a computer readable program code, which, when executed in a terminal equipment, will cause the terminal equipment to carry out the downlink signal monitoring method described in Embodiment 1 or 3.

An embodiment of this disclosure provides a computer storage medium, including a computer readable program code, which will cause a terminal equipment to carry out the downlink signal monitoring method described in Embodiment 1 or 3.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

Supplement 1. A downlink signal monitoring method, including:

monitoring a downlink signal by a terminal equipment according to an antenna port quasi-co-location parameter;

wherein the antenna port quasi-co-location parameter is related to a first cell and/or a second cell.

Supplement 2. The method according to supplement 1, wherein the first cell includes at least one of the following: a cell associated with a reference signal index corresponding to the downlink signal, a cell transmitting physical random access channel transmission corresponding to the downlink signal, a cell initiating a beam failure recovery procedure corresponding to the downlink signal.

Supplement 3. The method according to supplement 1, wherein the second cell includes at least one of the following: a cell where a terminal equipment monitors the downlink signal, a special cell (Spcell), one or more non-special cells other than the special cell.

Supplement 4. The method according to supplement 3, wherein the special cell includes at least one of the following: a primary cell (PCell) in a master cell group (MCG) in a case of dual-connectivity, a primary cell (PSCell) in a secondary cell group (SCG) in a case of dual-connectivity, a primary cell in a case of non-dual-connectivity.

Supplement 5. The method according to supplement 2, wherein the reference signal index is provided by a higher layer, and is selected by the terminal equipment from a candidate beam reference signal list configured by the higher layer; and the reference signal includes at least one of the following: a channel state information reference signal, a synchronization signal, a physical broadcast channel.

Supplement 6. The method according to any one of supplements 1-5, wherein in a case where the first cell and the second cell are identical, the terminal equipment monitors the downlink signal according to the antenna port quasi-co-location parameter associated with the reference signal index with which the first cell is associated.

Supplement 7. The method according to any one of supplements 1-5, wherein, in a case where the first cell and the second cell are different and there exists no corresponding activated transmission configuration indication (TCI) state in a control resource set (CORESET) monitoring the downlink signal, the terminal equipment monitors the downlink signal according to the antenna port quasi-co-location parameter associated with the reference signal index with which the first cell is associated.

Supplement 8. The method according to any one of supplements 1-5, wherein, in a case where the first cell and the second cell are different and a higher layer configuration parameter is not configured or the parameter is configured as being in a first state, the terminal equipment monitors the downlink signal according to the antenna port quasi-co-location parameter associated with the reference signal index with which the first cell is associated.

Supplement 9. The method according to supplement 8, wherein the higher layer configuration parameter is configured by a network device and is used to acquire the quasi-co-location parameter, and the higher layer configuration parameter is capable of being configured to be in the first state or in the second state.

Supplement 10. The method according to any one of supplements 1-5, wherein, in a case where the first cell and the second cell are different, the terminal equipment monitors the downlink signal according to the antenna port quasi-co-location parameter associated with the second cell.

Supplement 11. The method according to supplement 10, wherein the antenna port quasi-co-location parameter associated with the second cell includes at least one of the following:

an antenna port quasi-co-location parameter of a reference signal associated with a physical random access channel (PRACH) transmission to which the downlink signal corresponds;

an antenna port quasi-co-location parameter used for receiving a physical downlink shared channel when an interval between downlink control information (DCI) and the physical downlink shared channel (PDSCH) scheduled by downlink control information is less than a threshold;

an antenna port quasi-co-location parameter to which an activated TCI state corresponding to a control resource set (CORESET) monitoring the downlink signal corresponds;

a parameter used for physical downlink control channel (PDCCH) quasi-co-location indication within a latest slot having a lowest control resource set index in one or more control resource sets configured for the terminal equipment in an activated bandwidth part of a cell, if there exists no corresponding activated TCI state in the CORESET monitoring the downlink signal;

an antenna port quasi-co-location parameter to which an activated TCI state corresponding to the CORESET monitoring the downlink signal corresponds, if there exists the corresponding activated TCI state in the CORESET monitoring the downlink signal; and a parameter used for physical downlink control channel (PDCCH) quasi-co-location indication within a latest slot having a lowest control resource set index in one or more control resource sets configured for the terminal equipment in an activated bandwidth part of a cell, if there exists no corresponding activated TCI state in the control resource set monitoring the downlink signal; an antenna port quasi-co-location parameter to which an activated TCI state corresponding to the control resource set monitoring the downlink signal corresponds, if there exists the corresponding activated TCI state in the CORESET monitoring the downlink signal.

Supplement 12. The method according to any one of supplements 1-5, wherein, in a case where the first cell and the second cell are different and there exists a corresponding activated transmission configuration indication (TCI) state in a control resource set (CORESET) monitoring the downlink signal, the terminal equipment monitors the downlink signal according to the antenna port quasi-co-location parameter associated with the second cell.

Supplement 13. The method according to supplement 12, wherein the antenna port quasi-co-location parameter associated with the second cell includes at least one of the following:

an antenna port quasi-co-location parameter of a reference signal associated with a physical random access channel (PRACH) transmission to which the downlink signal corresponds;

an antenna port quasi-co-location parameter used for receiving a physical downlink shared channel (PDSCH) when an interval between DCI and the physical downlink shared channel scheduled by the DCI is less than a threshold;

an antenna port quasi-co-location parameter to which an activated TCI state corresponding to a control resource set (CORESET) monitoring the downlink signal corresponds.

Supplement 14. The method according to any one of supplements 1-5, wherein, in a case where the first cell and the second cell are different and the higher layer configuration parameter is not configured or the parameter is configured as being in a second state, the terminal equipment monitors the downlink signal according to the antenna port quasi-co-location parameter associated with the second cell.

Supplement 15. The method according to supplement 14, wherein the antenna port quasi-co-location parameter associated with the second cell includes at least one of the following:

an antenna port quasi-co-location parameter of a reference signal associated with a physical random access channel (PRACH) transmission to which the downlink signal corresponds;

an antenna port quasi-co-location parameter used for receiving a physical downlink shared channel (PDSCH) when an interval between DCI and the PDSCH scheduled by the downlink control information (DCI) is less than a threshold;

an antenna port quasi-co-location parameter to which an activated TCI state corresponding to a control resource set (CORESET) monitoring the downlink signal corresponds;

a parameter used for physical downlink control channel (PDCCH) quasi-co-location indication within a latest slot having a lowest control resource set index in one or more control resource sets configured for the terminal equipment in an activated bandwidth part (BWP) of a cell, if there exists no corresponding activated TCI state in the CORESET monitoring the downlink signal;

an antenna port quasi-co-location parameter to which an activated TCI state corresponding to the CORESET monitoring the downlink signal corresponds, if there exists the corresponding activated TCI state in the CORESET monitoring the downlink signal; and a parameter used for physical downlink control channel (PDCCH) quasi-co-location indication within a latest slot having a lowest control resource set index in one or more control resource sets configured for the terminal equipment in an activated bandwidth part of a cell, if there exists no corresponding activated TCI state in the control resource set monitoring the downlink signal; an antenna port quasi-co-location parameter to which an activated TCI state corresponding to the control resource set monitoring the downlink signal corresponds, if there exists the corresponding activated TCI state in the CORESET monitoring the downlink signal.

Supplement 16. The method according to any one of supplements 1-15, wherein the method further includes:

receiving, by the terminal equipment, a monitoring parameter used for monitoring the downlink signal by the network device, the monitoring parameter being used for indicating the terminal equipment to monitor the downlink signal according to an antenna port quasi-co-location parameter.

Supplement 17. A downlink signal transmitting method, including:

transmitting a downlink signal by a network device to a terminal equipment according to an antenna port quasi-co-location parameter;

wherein the antenna port quasi-co-location parameter is related to a first cell and/or a second cell.

Supplement 18. The method according to supplement 17, wherein the method further includes:

transmitting a monitoring parameter used for monitoring a downlink signal by the network device to the terminal equipment, the monitoring parameter being used to indicate the terminal equipment to monitor the downlink signal according to the antenna port quasi-co-location parameter.

Supplement 19. The method according to supplement 17 or 18, wherein the method further includes:

transmitting information used for indicating a higher layer configuration parameter by the network device to the terminal equipment, the higher layer configuration parameter indicating the terminal equipment to acquire the antenna port quasi-co-location parameter.

Supplement 20. The method according to supplement 19, wherein in a case where the higher layer configuration parameter is not configured or the parameter is configured as being in a first state, the higher layer configuration parameter indicates the terminal equipment to use identical antenna port quasi-co-location parameters to monitor downlink signal(s) of the first cell and the second cell.

Supplement 21. The method according to supplement 20, wherein the higher layer configuration parameter indicates the terminal equipment to use an antenna port quasi-co-location parameter associated with a reference signal index with which the first cell is associated to monitor the downlink signal of the first cell and the downlink signal of the second cell.

Supplement 22. The method according to supplement 19, wherein when the higher layer configuration parameter is not configured or the parameter is configured as being in a second state, the higher layer configuration parameter indicates the terminal equipment to use different quasi-co-location parameters to monitor the downlink signals of the first cell and the second cell.

Supplement 23. The method according to supplement 22, wherein the higher layer configuration parameter indicates the terminal equipment to use an antenna port quasi-co-location parameter associated with a reference signal index with which the first cell is associated to monitor the downlink signal of the first cell, and indicates the terminal equipment to use an antenna port quasi-co-location parameter associated with the second cell to monitor the downlink signal of the second cell.

Supplement 24. The method according to any one of supplements 19-23, wherein the higher layer configuration parameter is included in a beam failure recovery configuration of a cell, or is only configured in a beam failure recovery configuration of a primary cell.

Supplement 25. The method according to any one of supplements 17-24, wherein the first cell includes at least one of the following: a cell associated with a reference signal index corresponding to the downlink signal, a cell transmitting physical random access channel transmission corresponding to the downlink signal, a cell initiating a beam failure recovery procedure corresponding to the downlink signal.

Supplement 26. The method according to any one of supplements 17-25, wherein the second cell includes at least one of the following: a cell where a terminal equipment monitors the downlink signal, a special cell, a non-special cell other than the special cell.

Supplement 27. The method according to supplement 26, wherein the special cell includes at least one of the following: a primary cell (PCell) in a master cell group (MCG) in a case of dual-connectivity, a primary cell (PSCell) in a secondary cell group (SCG) in a case of dual-connectivity, a primary cell in a case of non-dual-connectivity.

Supplement 28. A downlink signal monitoring method, including:

monitoring a downlink signal by a terminal equipment according to an antenna port quasi-co-location parameter;

wherein the antenna port quasi-co-location parameter is related to a first reference signal index and a second reference signal index.

Supplement 29. The method according to supplement 28, wherein the first reference signal index is selected by the terminal equipment from a candidate beam parameter list configured by a higher layer.

Supplement 30. The method according to supplement 28, wherein the second reference signal index is selected by the terminal equipment from transmission configuration indication state configuration information.

Supplement 31. The method according to supplement 30, wherein the transmission configuration indication state configuration information is transmission configuration indication state configuration information to which a control resource set monitoring the downlink signal corresponds.

Supplement 32. The method according to any one of supplements 28-31, wherein when the second reference signal index is provided, the terminal equipment monitors the downlink signal according to the antenna port quasi-co-location parameter associated with the second reference signal index; otherwise, the terminal equipment monitors the downlink signal according to the antenna port quasi-co-location parameter associated with the first reference signal index.

Supplement 33. The method according to any one of supplements 28-31, wherein when the second reference signal index is of a specific value, the terminal equipment monitors the downlink signal according to the antenna port quasi-co-location parameter associated with the second reference signal index; otherwise, the terminal equipment monitors the downlink signal according to the antenna port quasi-co-location parameter associated with the first reference signal index.

Supplement 34. The method according to any one of supplements 28-33, wherein the method further includes:

receiving, by the terminal equipment, a monitoring parameter used for monitoring the downlink signal by the network device, the monitoring parameter being used for indicating the terminal equipment to monitor the downlink signal according to an antenna port quasi-co-location parameter.

Supplement 35. A downlink signal transmitting method, including:

transmitting a downlink signal by network device to a terminal equipment according to an antenna port quasi-co-location parameter;

wherein the antenna port quasi-co-location parameter is related to a first reference signal index and a second reference signal index.

Supplement 36. The method according to supplement 35, wherein the method further includes:

transmitting a monitoring parameter used for monitoring the downlink signal by the network device to the terminal equipment, the monitoring parameter being used for indicating the terminal equipment to monitor the downlink signal according to the antenna port quasi-co-location parameter.

Supplement 37. The method according to supplement 35 or 36, wherein the first reference signal index is selected by the terminal equipment from a candidate beam parameter list configured by a higher layer.

Supplement 38. The method according to supplement 35 or 36, wherein the second reference signal index is selected by the terminal equipment from transmission configuration indication state configuration information.

Supplement 39. The method according to supplement 38, wherein the transmission configuration indication state configuration information is transmission configuration indication state configuration information to which a control resource set monitoring the downlink signal corresponds.

Supplement 40. A method for configuring a downlink signal, including:
transmitting information used for indicating a higher layer configuration parameter by a network device to a terminal equipment, the higher layer configuration parameter indicating the terminal equipment to acquire an antenna port quasi-co-location parameter.

Supplement 41. The method according to supplement 40, wherein in a case where the higher layer configuration parameter is not configured or the parameter is configured as being in a first state, the higher layer configuration parameter indicates the terminal equipment to use identical antenna port quasi-co-location parameters to monitor downlink signal(s) of the first cell and the second cell.

Supplement 42. The method according to supplement 41, wherein the higher layer configuration parameter indicates the terminal equipment to use an antenna port quasi-co-location parameter associated with a reference signal index with which the first cell is associated to monitor the downlink signal of the first cell and the downlink signal of the second cell.

Supplement 43. The method according to supplement 40, wherein when the higher layer configuration parameter is not configured or the parameter is configured as being in a second state, the higher layer configuration parameter indicates the terminal equipment to use different quasi-co-location parameters to monitor the downlink signals of the first cell and the second cell.

Supplement 44. The method according to supplement 43, wherein the higher layer configuration parameter indicates the terminal equipment to use an antenna port quasi-co-location parameter associated with a reference signal index with which the first cell is associated to monitor the downlink signal of the first cell,
and indicates the terminal equipment to use an antenna port quasi-co-location parameter associated with the second cell to monitor the downlink signal of the second cell.

Supplement 45. The method according to any one of supplements 40-44, wherein the higher layer configuration parameter is included in a beam failure recovery configuration of a cell, or is only configured in a beam failure recovery configuration of a primary cell.

Supplement 46. A terminal equipment, including a memory and a processor, the memory storing a computer program, and the processor being configured to execute the computer program to carry out the downlink signal monitoring method as described in any one of supplements 1-16 and 28-34.

Supplement 47. A network device, including a memory and a processor, the memory storing a computer program, and the processor being configured to execute the computer program to carry out the downlink signal transmitting method as described in any one of supplements 17-27 and 35-39 or the method for configuring a parameter as described in any one of supplements 40-45.

Supplement 48. A communication system, including:
the terminal equipment as described in supplement 46; and
the network device as described in supplement 4

The invention claimed is:

1. A downlink signal monitoring apparatus, comprising:
a memory that stores a plurality of instructions; and
processor circuitry that couples to the memory and is configured to execute the instructions to:
monitor a downlink signal according to an antenna port quasi-co-location parameter;
wherein the antenna port quasi-co-location parameter is related to a first cell and/or a second cell,
wherein the first cell comprises at least a cell associated with a reference signal index corresponding to the downlink signal,
wherein the reference signal index is provided by a higher layer, and is selected by the terminal equipment from a candidate beam reference signal list configured by the higher layer, and
wherein the reference signal comprises at least one of the following: a channel state information reference signal, synchronization signal, and a physical broadcast channel.

2. The apparatus according to claim 1, wherein the special cell comprises at least one of the following: a primary cell in a master cell group in a case of dual-connectivity, a primary cell in a secondary cell group in a case of dual-connectivity, a primary cell in a case of non-dual-connectivity.

3. The apparatus according to claim 1, wherein in a case where the first cell and the second cell are identical, the processor circuitry is further configured to monitor the downlink signal according to the antenna port quasi-co-location parameter associated with the reference signal index with which the first cell is associated; and/or in a case where the first cell and the second cell are different, the processor circuitry is further configured to monitor the downlink signal according to the antenna port quasi-co-location parameter associated with the second cell.

4. The apparatus according to claim 1, wherein in a case where the first cell and the second cell are different and there exists no corresponding activated transmission configuration indication state in a control resource set monitoring the downlink signal, the processor circuitry is further configured to monitor the downlink signal according to the antenna port quasi-co-location parameter associated with the reference signal index with which the first cell is associated; and/or
in a case where the first cell and the second cell are different and there exists a corresponding activated transmission configuration indication state in a control resource set monitoring the downlink signal, the processor circuitry is further configured to monitor the downlink signal according to the antenna port quasi-co-location parameter associated with the second cell.

5. The apparatus according to claim 1, wherein in a case where the first cell and the second cell are different and a higher layer configuration parameter is not configured or the parameter is configured as being in a first state, the processor circuitry is further configured to monitor the downlink signal according to the antenna port quasi-co-location parameter associated with the reference signal index with which the first cell is associated; and/or
in a case where the first cell and the second cell are different and the higher layer configuration parameter is not configured or the parameter is configured as being in a second state, the processor circuitry is further configured to monitor the downlink signal according to the antenna port quasi-co-location parameter associated with the second cell.

6. The apparatus according to claim 5, wherein the higher layer configuration parameter is configured by a network device and is used to acquire the quasi-co- location parameter, and the higher layer configuration parameter is capable of being configured to be in the first state or in the second state; and/or the higher layer configuration parameter is included in a beam failure recovery configuration of a cell, or is only configured in a beam failure recovery configuration of a primary cell.

7. The apparatus according to claim 1, wherein the antenna port quasi-co- location parameter associated with the second cell comprises at least one of the following:

an antenna port quasi-co-location parameter of a reference signal associated with a physical random access channel transmission to which the downlink signal corresponds;

an antenna port quasi-co-location parameter used for receiving a physical downlink shared channel when an interval between downlink control information and the physical downlink shared channel scheduled by the downlink control information is less than a threshold;

an antenna port quasi-co-location parameter to which an activated transmission configuration indication state corresponding to a control resource set monitoring the downlink signal corresponds;

a parameter used for physical downlink control channel quasi-co-location indication within a latest slot having a lowest control resource set index in one or more control resource sets configured for the terminal equipment in an activated bandwidth part of a cell, if there exists no corresponding activated transmission configuration indication state in the control resource set monitoring the downlink signal;

an antenna port quasi-co-location parameter to which an activated transmission configuration indication state corresponding to the control resource set monitoring the downlink signal corresponds, if there exists the corresponding activated transmission configuration indication state in the control resource set monitoring the downlink signal; and a parameter used for physical downlink control channel quasi-co-location indication within a latest slot having a lowest control resource set index in one or more control resource sets configured for the terminal equipment in an activated bandwidth part of a cell, if there exists no corresponding activated transmission configuration indication state in the control resource set monitoring the downlink signal; an antenna port quasi-co-location parameter to which an activated transmission configuration indication state corresponding to the control resource set monitoring the downlink signal corresponds, if there exists the corresponding activated transmission configuration indication state in the control resource set monitoring the downlink signal.

8. The apparatus according to claim 1, the processor circuitry is further configured to:

transmit a MAC CE before monitoring the downlink signal according to the antenna port quasi co-location parameter, wherein the MAC CE is related to the reference signal.

9. A downlink signal transmitting apparatus, comprising:

a memory that stores a plurality of instructions; and processor circuitry that couples to the memory and is configured to execute the instructions to:

transmit a downlink signal to a terminal equipment according to an antenna port quasi-co-location parameter;

wherein the antenna port quasi-co-location parameter is related to a first cell and/or a second cell, wherein the first cell comprises at least a cell associated with a reference signal index corresponding to the downlink signal, wherein the second cell comprises at least one of the following: a cell where a terminal equipment is located in monitoring the downlink signal, and one or more non-special cells other than a special cell, wherein the reference signal index is provided by a higher layer, and is selected by the terminal equipment from a candidate beam reference signal list configured by the higher layer, and wherein the reference signal comprises at least one of the following: a channel state information reference signal, a synchronization signal, a physical broadcast channel.

10. The apparatus according to claim 9, wherein the processor circuitry is further configured to:

transmit a monitoring parameter used for monitoring the downlink signal and/or information used for indicating a higher layer configuration parameter to the terminal equipment, the higher layer configuration parameter being used to indicate the terminal equipment to acquire the antenna port quasi-co-location parameter.

11. The apparatus according to claim 10, wherein when the higher layer configuration parameter is not configured or the parameter is configured as being in a first state, the higher layer configuration parameter indicates the terminal equipment to use identical quasi-co-location parameters to monitor the downlink signals of the first cell and the second cell.

12. The apparatus according to claim 11, wherein the higher layer configuration parameter indicates the terminal equipment to use an antenna port quasi- co-location parameter associated with a reference signal index with which the first cell is associated to monitor the downlink signal of the first cell and the downlink signal of the second cell.

13. The apparatus according to claim 10, wherein when the higher layer configuration parameter is not configured or the parameter is configured as being in a second state, the higher layer configuration parameter indicates the terminal equipment to use different quasi-co-location parameters to monitor the downlink signals of the first cell and the second cell.

14. The apparatus according to claim 13, wherein the higher layer configuration parameter indicates the terminal equipment to use an antenna port quasi- co-location parameter associated with a reference signal index with which the first cell is associated to monitor the downlink signal of the first cell;

and indicates the terminal equipment to use an antenna port quasi-co-location parameter associated with the second cell to monitor the downlink signal of the second cell.

* * * * *